United States Patent
Barbisan

(10) Patent No.: US 9,308,140 B2
(45) Date of Patent: Apr. 12, 2016

(54) PARAMEDIC CHAIR CARRIER

(71) Applicant: Lugino Barbisan, Niagara Falls (CA)

(72) Inventor: Lugino Barbisan, Niagara Falls (CA)

(*) Notice: Subject to any disclaimer, the term of this patent is extended or adjusted under 35 U.S.C. 154(b) by 288 days.

(21) Appl. No.: 14/033,402

(22) Filed: Sep. 20, 2013

(65) Prior Publication Data

US 2015/0083771 A1     Mar. 26, 2015

(51) Int. Cl.
| | |
|---|---|
| *B60R 11/02* | (2006.01) |
| *A61G 1/017* | (2006.01) |
| *F16M 11/42* | (2006.01) |
| *A61G 1/013* | (2006.01) |
| *A61G 3/08* | (2006.01) |

(52) U.S. Cl.
CPC ............ *A61G 1/017* (2013.01); *A61G 1/013* (2013.01); *A61G 3/0841* (2013.01); *F16M 11/425* (2013.01)

(58) Field of Classification Search
CPC ......... A61G 1/06; A61G 1/017; A61G 3/062; A61G 3/0808; A61G 1/013; A61G 3/0841; F16M 11/425
USPC .................. 224/545, 521, 548; 414/541, 462; 248/655; 5/86.1, 618, 625
See application file for complete search history.

(56) References Cited

U.S. PATENT DOCUMENTS

| | | | | |
|---|---|---|---|---|
| 2,362,721 A | * | 11/1944 | Reynolds ............... | A61G 1/013 280/47.25 |
| 2,498,161 A | * | 2/1950 | Hamilton .............. | B60P 1/4421 296/51 |
| 2,596,250 A | * | 5/1952 | Klingler ................. | A61G 1/013 108/167 |
| 3,122,758 A | * | 3/1964 | Ferneau ................. | A61G 1/017 297/1 |
| 3,137,511 A | * | 6/1964 | Weil ........................ | A61G 5/006 280/30 |
| 3,182,826 A | * | 5/1965 | Mutto .................... | B60P 1/4428 414/541 |
| 3,289,219 A | * | 12/1966 | Ferneau ............... | A61G 1/0565 296/20 |
| 3,380,085 A | * | 4/1968 | Ferneau ................. | A61G 5/006 254/9 R |
| 3,476,404 A | * | 11/1969 | Rachman ............... | A61G 3/063 280/30 |
| 3,516,559 A | * | 6/1970 | Walter ................... | B60P 1/4428 187/901 |
| 3,638,813 A | * | 2/1972 | Strong ................... | A61G 3/063 414/544 |

(Continued)

FOREIGN PATENT DOCUMENTS

| | | | | |
|---|---|---|---|---|
| DE | | 4221170 A1 | * 1/1994 | ............ A61G 3/062 |
| DE | 102007014931 | | 6/2008 | |

(Continued)

*Primary Examiner* — Justin Larson
*Assistant Examiner* — Lester L Vanterpool
(74) *Attorney, Agent, or Firm* — Steven M. Greenberg; CRGO Law

(57) ABSTRACT

A paramedic chair carrier is provided comprising a main frame and a sliding frame slidably carried by the main frame so as to be slidable between an extended position and a retracted position relative to the main frame. A gas spring acts between the main frame and the sliding frame to bias the sliding frame toward the retracted position. A chair support hook on the sliding frame supports the paramedic chair and a chair handle latch is carried by the main frame for releasably retaining the handle of the paramedic chair. A locking latch system comprising a first lock component carried by the sliding frame and a second lock component carried by the main frame releasably locks the sliding frame in the retracted position.

18 Claims, 8 Drawing Sheets

(56) References Cited

U.S. PATENT DOCUMENTS

| | | | | |
|---|---|---|---|---|
| 4,060,079 A | * | 11/1977 | Reinhold, Jr. | A61H 31/008 128/204.18 |
| 4,096,955 A | * | 6/1978 | Dake | B60P 1/4442 414/541 |
| 4,365,924 A | * | 12/1982 | Brigman | A61G 3/06 280/304.1 |
| 4,479,753 A | * | 10/1984 | Thorley | A61G 3/06 187/243 |
| 4,664,584 A | * | 5/1987 | Braun | A61G 3/06 187/217 |
| 4,738,581 A | * | 4/1988 | Kuhlman | A61G 3/0209 224/492 |
| 5,011,361 A | * | 4/1991 | Peterson | B60R 9/06 224/497 |
| 5,026,244 A | * | 6/1991 | Dorn | A61G 3/02 414/540 |
| 5,180,275 A | * | 1/1993 | Czech | A61G 3/06 187/200 |
| 5,308,214 A | * | 5/1994 | Crain | A61G 3/0209 414/541 |
| 5,375,277 A | * | 12/1994 | Carr | A61G 1/017 280/47.25 |
| 5,542,811 A | * | 8/1996 | Vartanian | A61G 3/06 414/541 |
| 5,674,043 A | * | 10/1997 | Dorn | A61G 3/06 187/222 |
| 6,381,781 B1 | * | 5/2002 | Bourgraf | A61G 1/0565 296/20 |
| 6,595,398 B2 | * | 7/2003 | Himel, Jr. | B60R 9/06 224/495 |
| 7,396,202 B1 | * | 7/2008 | Panzarella | A61G 3/06 414/540 |
| 7,581,265 B1 | * | 9/2009 | Bourgraf | A61G 1/017 5/618 |
| 7,818,840 B2 | * | 10/2010 | Barnett | A61G 1/013 224/156 |
| 8,398,356 B2 | * | 3/2013 | Sandoz | A61G 3/0808 414/541 |
| 2002/0037212 A1 | * | 3/2002 | Rock | B60P 1/4428 414/541 |
| 2008/0001421 A1 | * | 1/2008 | Matunaga | A61G 1/017 296/20 |
| 2009/0016866 A1 | * | 1/2009 | Zaragoza | A61G 3/0209 414/541 |

FOREIGN PATENT DOCUMENTS

| | | | | |
|---|---|---|---|---|
| FR | 2886539 A1 | * | 12/2006 | A61G 1/013 |
| JP | 1998000215878 | | 2/2000 | |
| JP | 200200005507 | | 7/2003 | |

\* cited by examiner

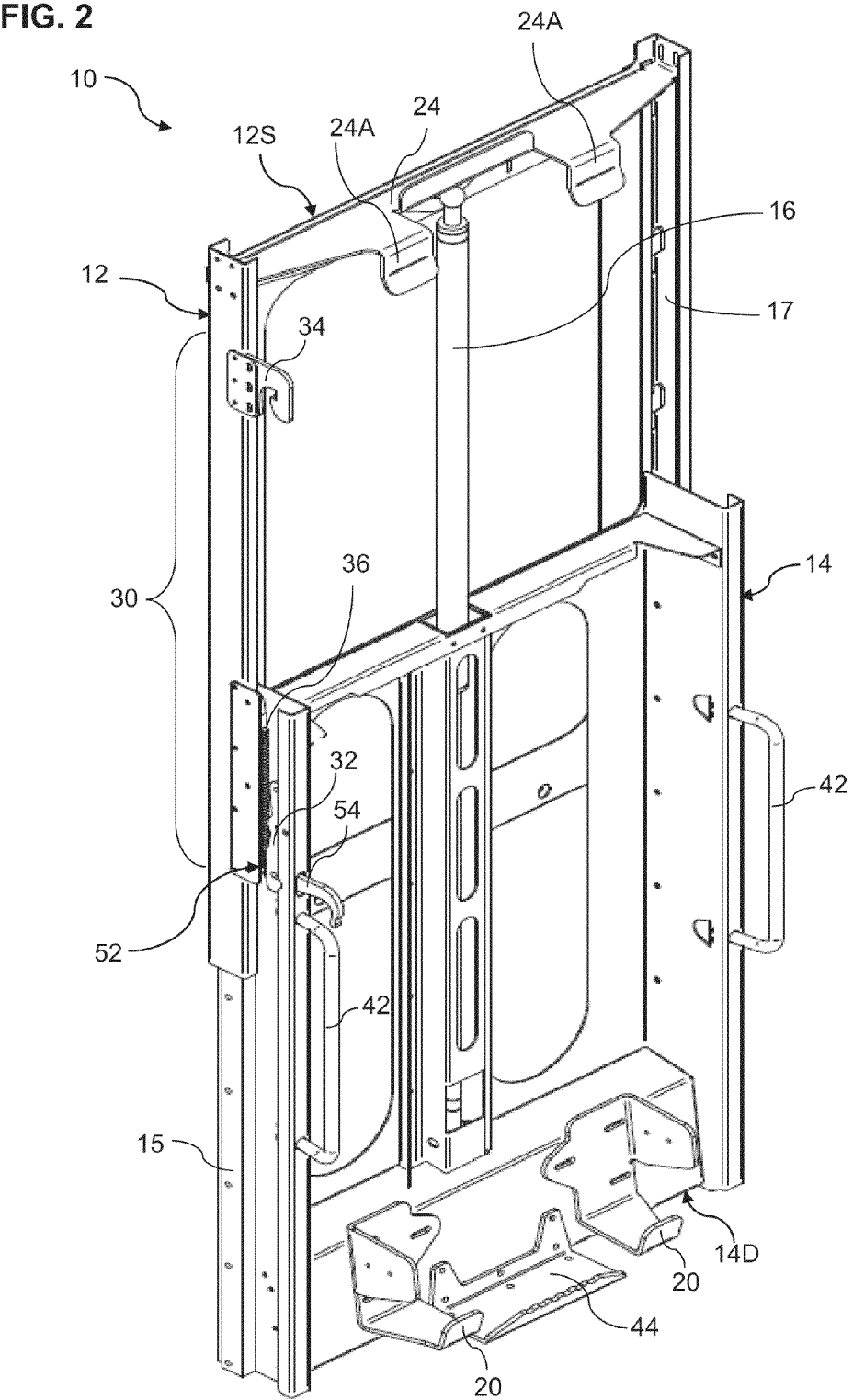

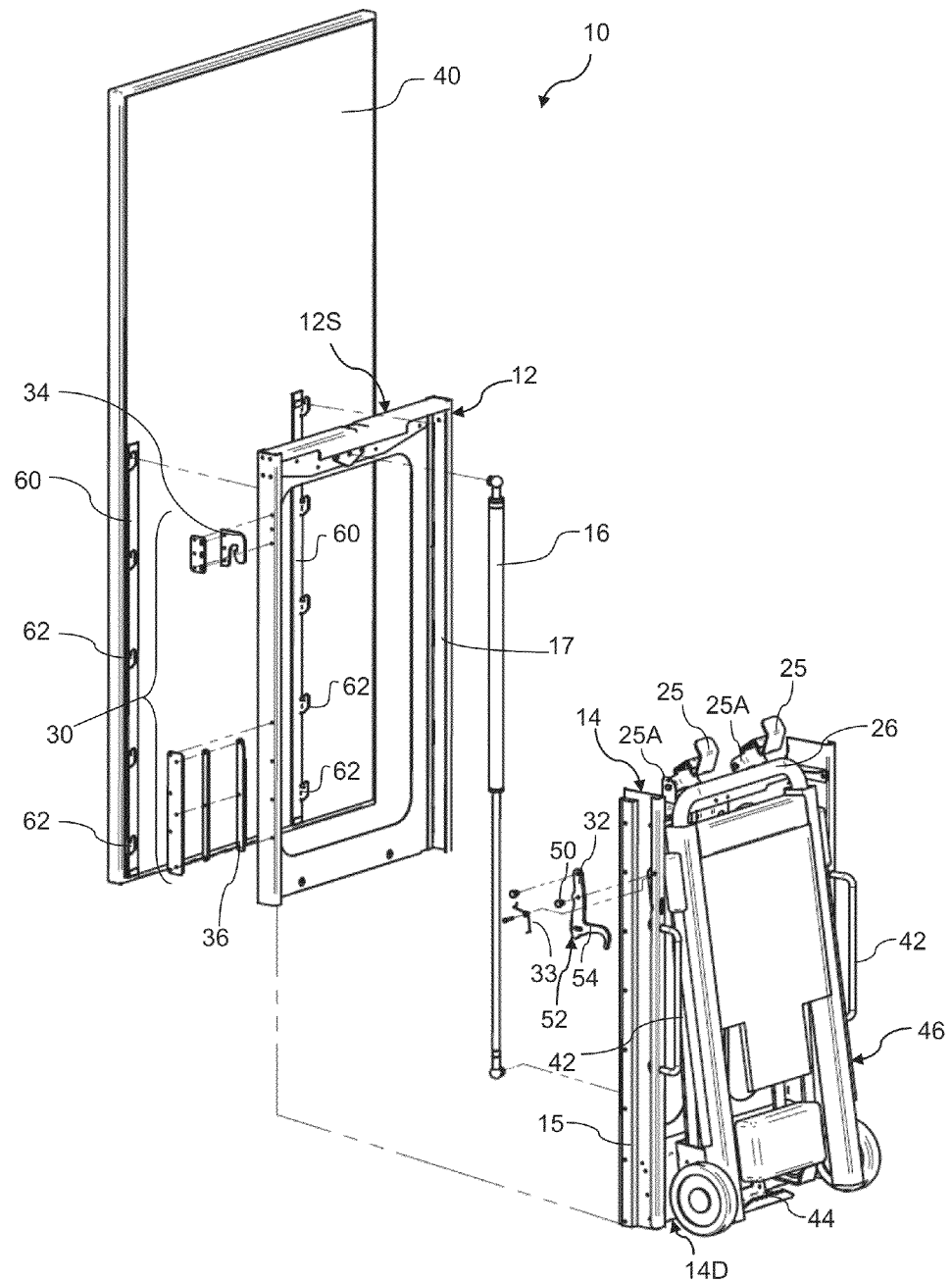

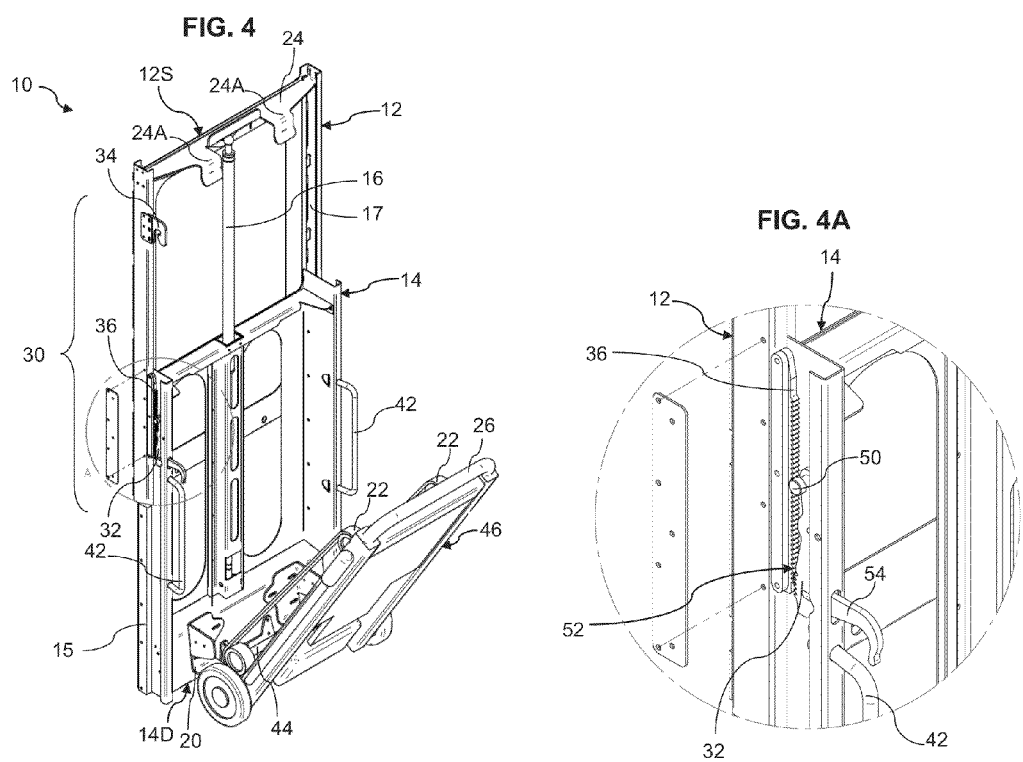

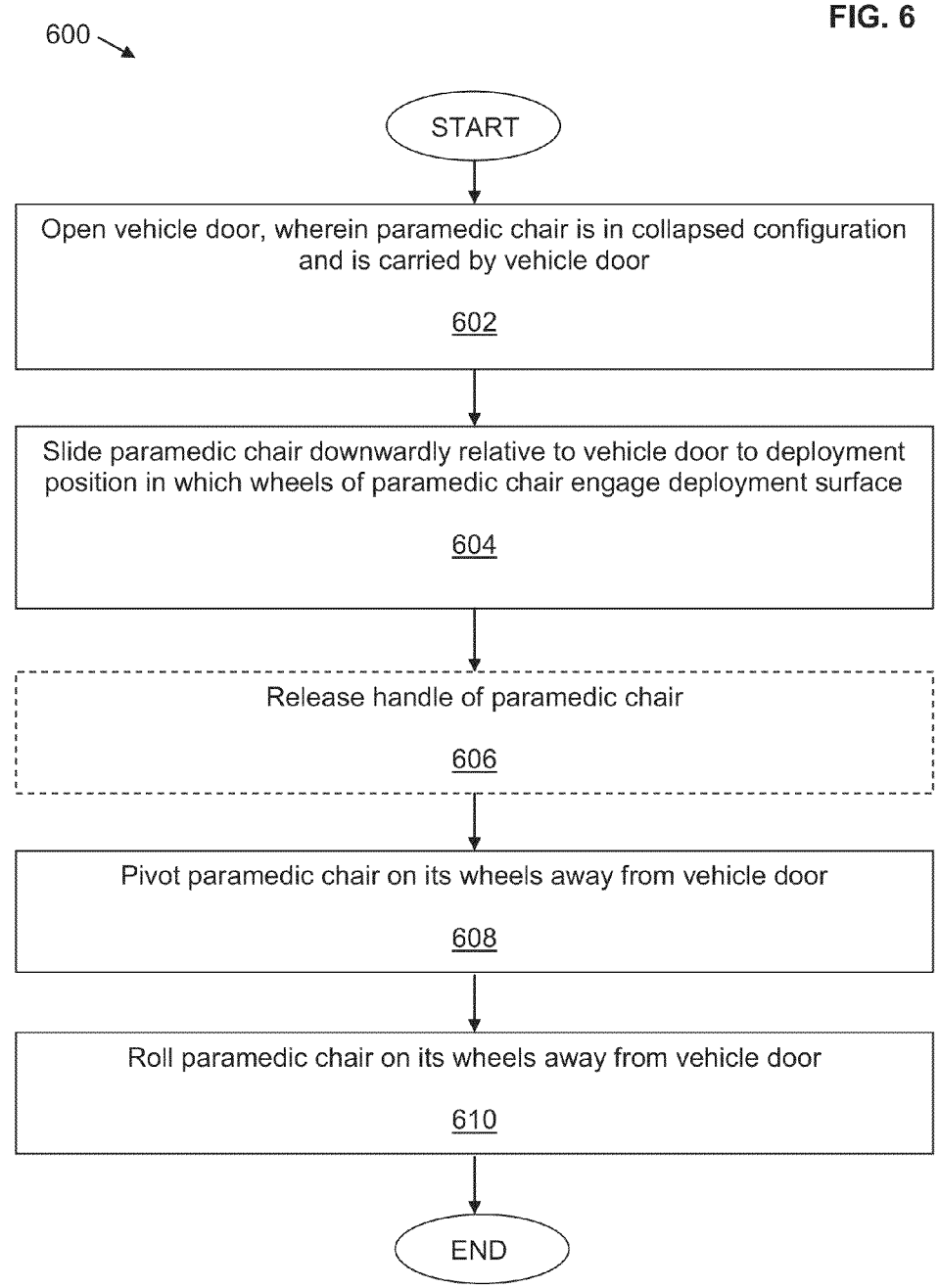

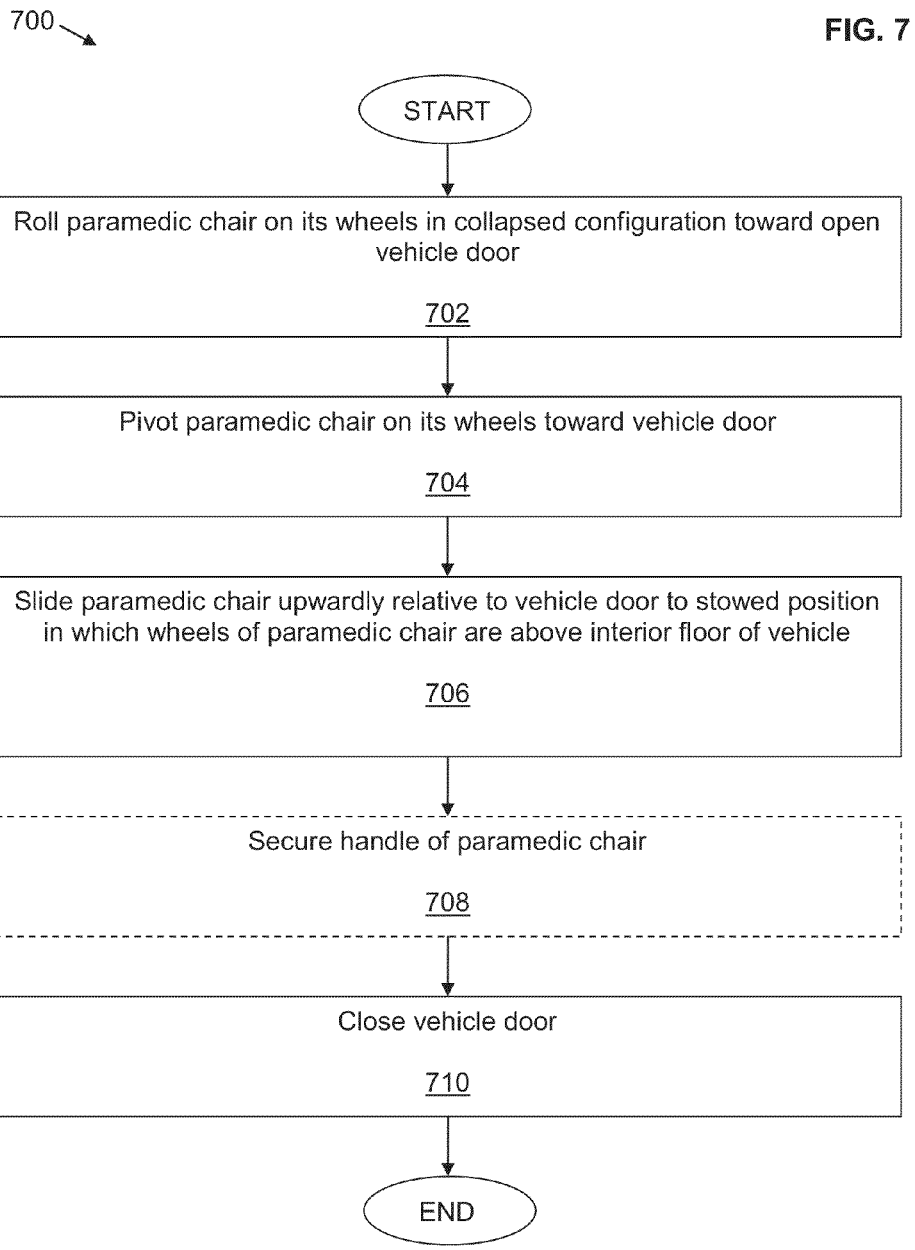

PARAMEDIC CHAIR CARRIER

TECHNICAL FIELD

The present disclosure relates to the field of paramedic equipment and more particularly to the field of carriers for paramedic chairs.

BACKGROUND

A paramedic chair is a collapsible chair used by paramedics to transport patients in situations where a stretcher or other moving device is not well-suited, such as up and down stairs or through confined spaces. When not in use, the collapsible chair requires storage within an ambulance or other vehicle. Ready access to, and fast deployment of, paramedic chairs can be crucial in an emergency. Patients requiring urgent care place a demand on paramedics or other users to quickly deploy the paramedic chairs from storage to a usable position.

However, paramedic chairs are typically of substantial weight, ranging from basic so-called "lightweight" chairs of approximately 36 lbs to heavier chairs weighing upwards of 65 lbs. Thus, deploying the paramedic chair from storage can be a daunting task.

SUMMARY

A paramedic chair carrier comprises a main frame and a sliding frame slidably carried by the main frame so as to be slidable between an extended position and a retracted position, relative to the main frame. A gas spring acts between the main frame and the sliding frame to bias the sliding frame toward the retracted position. At least one chair support hook is disposed at distal end of the sliding frame relative to the main frame for supporting the paramedic chair, and a chair handle latch is carried by the main frame for releasably retaining the handle of the paramedic chair. In this way, the paramedic chair is retained in the paramedic chair carrier. A locking latch system comprises a first lock component carried by the sliding frame and a second lock component carried by the main frame, with the first lock component and the second lock component being selectively interengageable to releasably lock the sliding frame in the retracted position to store the paramedic chair when not in use.

In some embodiments, the chair handle latch is carried by the sliding frame.

In a preferred embodiment, the locking latch system further comprises a third lock component carried by the main frame, and the first lock component and the third lock component are selectively interengageable to releasably lock the sliding frame in the extended position. In a still further preferred embodiment, the first lock component and the third lock component are selectively interengageable to releasably lock the sliding frame in at least one intermediate position between the extended position and the retracted position, with the intermediate position(s) being substantially closer to the extended position than to the retracted position.

In a preferred embodiment, the chair support hook(s) support the paramedic chair by tracks of the paramedic chair being received by the chair support hook(s).

The paramedic chair carrier may be mounted to an interior face of a vehicle door, with the sliding frame in the refracted position and a paramedic chair secured to the paramedic chair carrier by the paramedic chair being supported by the chair support hook(s) and the handle of the paramedic chair being releasably retained by the chair handle latch. The vehicle may be an ambulance, and the vehicle door may be a side service door.

The paramedic chair carrier may further comprise a step carried by the sliding frame at the distal end thereof for foot placement to assist in moving the sliding frame from the retracted position toward the extended position.

The paramedic chair carrier may further comprise at least one handle carried by the sliding frame to assist in moving the sliding frame between the refracted position and the extended position.

A method for deploying a paramedic chair from a vehicle, comprises opening a vehicle door, wherein the paramedic chair is in a collapsed configuration and is carried by the vehicle door, sliding the paramedic chair downwardly relative to the vehicle door to a deployment position in which wheels of the paramedic chair engage a deployment surface, pivoting the paramedic chair away from the vehicle door on the wheels of the paramedic chair, and rolling the paramedic chair away from the vehicle door. The method may further comprise releasing a handle of the paramedic chair before pivoting the paramedic chair away from the vehicle door.

A method for stowing a paramedic chair in a vehicle comprises rolling the paramedic chair toward an open vehicle door, wherein the paramedic chair is in a collapsed configuration, pivoting the paramedic chair toward the vehicle door on the wheels of the paramedic chair, sliding the paramedic chair upwardly relative to the vehicle door to a stowed position in which wheels of the paramedic chair are above an interior floor of the vehicle, and closing the vehicle door. The method may further comprise securing the handle of the paramedic chair after pivoting the paramedic chair toward the vehicle door on the wheels of the paramedic chair.

BRIEF DESCRIPTION OF THE DRAWINGS

These and other features will become more apparent from the following description in which reference is made to the appended drawings wherein:

FIG. 2 is a top front perspective view of the paramedic chair carrier of FIG. 1, shown in an extended configuration;

FIG. 3B is a top front exploded perspective view of the paramedic chair carrier of FIG. 3A shown in use with a paramedic chair;

FIG. 4 is a top front perspective view of the paramedic chair carrier of FIG. 1 showing the paramedic chair carrier in an extended configuration during mounting/removal of a paramedic chair from the paramedic chair carrier;

FIG. 4A is an enlarged view of a portion of FIG. 4;

FIG. 6 is a flow chart showing an exemplary method of deploying a paramedic chair from a vehicle; and FIG. 7 is a flow chart showing an exemplary method for stowing a paramedic chair in a vehicle.

DETAILED DESCRIPTION

Figure 1:
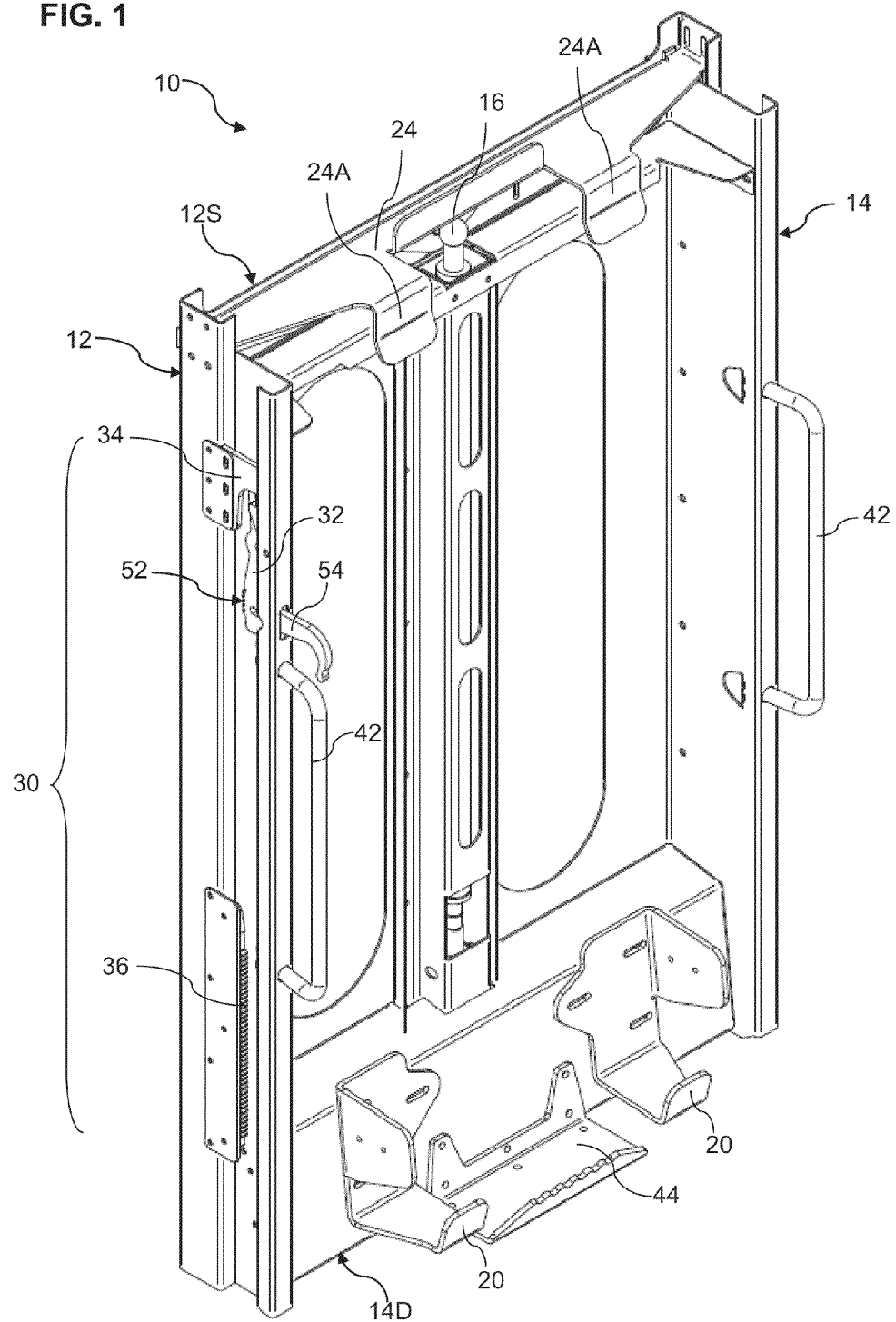
FIG. 1 is a top front perspective view of a first exemplary paramedic chair carrier shown in a retracted configuration.

In the accompanying illustrations, an exemplary paramedic chair carrier is generally indicated by reference numeral 10. As best seen in the exploded view shown in FIG. 3A, the paramedic chair carrier 10 comprises a main frame 12 and a sliding frame 14 slidably carried by the main frame 12 so as to be slidable between an extended position and a retracted position relative to the main frame 12. The assembled paramedic chair carrier 10 is shown with the sliding frame 14 in the retracted position in FIG. 1 and with the sliding frame 14 in the extended position in FIG. 2. In a preferred embodiment, the paramedic chair carrier 10 is mounted on an interior face of a vehicle door 40, typically a side service door such as an ambulance side service door; the door 40 may also be a rear bay door. In the illustrated embodiment, mounting bars 60 having a plurality of vertically spaced upwardly extending hooks 62 are secured to the interior face of the vehicle door 40, and the paramedic chair carrier 10 is hung from the mounting bars by inserting the hooks 62 into correspondingly positioned slots 64 (FIG. 5A) on the main frame 12 and may be further secured to the door 40 by any suitable technique. When the paramedic chair carrier 10 is mounted to the interior face of a vehicle door 40, a paramedic chair 46 in its collapsed configuration can be stored in the paramedic chair carrier 10 with the sliding frame 14 in the retracted position to permit the vehicle door 40 to open and close. The sliding frame 14 can be lowered into the extended position to enable the paramedic chair 46 to be deployed and recovered at or near ground level, as described further below.

In the illustrated embodiment, the sliding frame 14 includes a pair of opposed low-friction plastic guide rails 15 that are received within correspondingly positioned opposed guide channels 17 on the main frame 12. Low-friction plastic guide facings are secured within the guide channels 17, and the guide rails 15 engage and slide along the guide facings within the guide channels 17, enabling the sliding frame 14 to slide relative to the main frame 12. The guide rails 15 may be bolted on to the body of the sliding frame 14, and the guide facings may be adhered to the interior of the guide channels 17 using suitably strong adhesive or other suitable techniques. In a preferred embodiment, the guide rails 15 and guide facings are formed from ultra-high molecular weight (UHMW) polyethylene. The manner in which the sliding frame 14 is slidably carried by the main frame 12 in the illustrated embodiment is merely exemplary, and other slide-mounting arrangements may also be used.

Figure 3A:
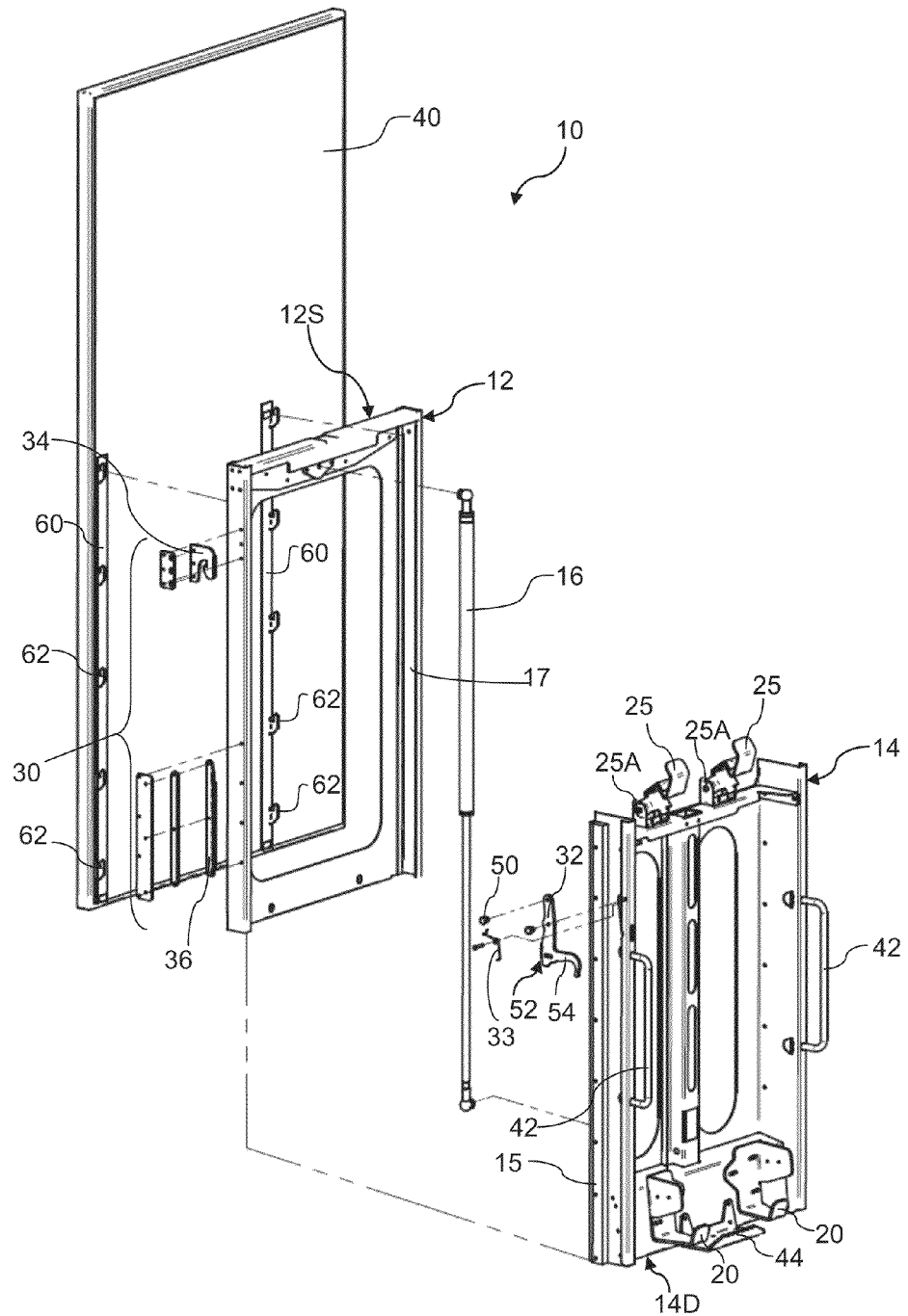
FIG. 3A is a top front exploded perspective view of a second exemplary paramedic chair carrier showing mounting thereof to a vehicle door.

Continuing to refer to FIG. 3A, a gas spring 16 acts between the main frame 12 and the sliding frame 14 to bias the sliding frame 14 toward the retracted position. In a preferred embodiment, the gas spring 16 biases the sliding frame 14 toward the retracted position with a force of approximately 25 pounds. A pair of opposed chair support hooks 20 is disposed at the distal end 14D of the sliding frame 14 for supporting a paramedic chair 46 (FIG. 3B); the distal end 14D of the sliding frame 14 is the end that is furthest from the main frame 12 when the sliding frame is in the extended position (FIG. 2). In the illustrated embodiment, the chair support hooks 20 engage and support the tracks 22 (FIG. 4) of the paramedic chair 46; in other embodiments one or more chair support hooks may equivalently engage and support other portions of a paramedic chair. Although the exemplary embodiment includes two chair support hooks 20, other embodiments may include only a single elongate chair support hook, or more than two chair support hooks, depending on the shape of the paramedic chair with which the paramedic chair carrier is to be used.

The exemplary paramedic chair carrier 10 also includes at least one chair handle latch carried by the main frame 12 for releasably retaining a paramedic chair handle 26 (FIGS. 3B and 4). The paramedic chair carrier 10 is shown in FIGS. 1, 2 and 4 to 5A with a first chair handle latch system mounted to the main frame 12 and comprising a single chair handle latch 24 extending between the guide channels 17 at the superior end 12S of the main frame 12. The chair handle latch 24 in FIGS. 1, 2 and 4 is formed from a resilient material such as sheet metal and includes two inferiorly depending, inwardly biased tabs 24A which can be flexed outwardly to permit a paramedic chair handle 26 to be moved therepast and then released to trap the paramedic chair handle 26. The paramedic chair carrier 10 is shown in FIGS. 3A and 3B with a second chair handle latch system carried by the sliding frame 14, independently of the main frame 12, and comprising a pair of latching tabs 25 pivotally mounted to respective brackets 25A on the sliding frame 14 and being lockable in a lowered retaining position (not shown) to trap the paramedic chair handle 26. Suitable locking mechanisms are known in the art and are not described further. Although the second chair handle latch system is carried by the sliding frame 14, since the sliding frame 14 is carried by the main frame 12, the second chair handle latch system is indirectly carried by the main frame 12.

Both the first chair handle latch system and the second chair handle latch system cooperate with the chair support hooks 20 to secure the paramedic chair 46 to the paramedic chair carrier 10 for storage. The two illustrated chair handle latch systems are merely exemplary, and other suitable latching systems may also be used.

The exemplary paramedic chair carrier 10 further comprises a locking latch system 30 (best seen in FIG. 5) that releasably locks the sliding frame 14 at least in the retracted position, preferably in both the retracted position and the extended position, and still more preferably in the retracted position, the extended position and at least one intermediate position between the retracted position and the extended position. The locking latch system 30 comprises a first lock component 32 carried by the sliding frame 14 and a second lock component 34 carried by the main frame 12. The first lock component 32 and the second lock component 34 are selectively interengageable with one another to releasably lock the sliding frame 14 in the retracted position, as described further below.

Figure 5:
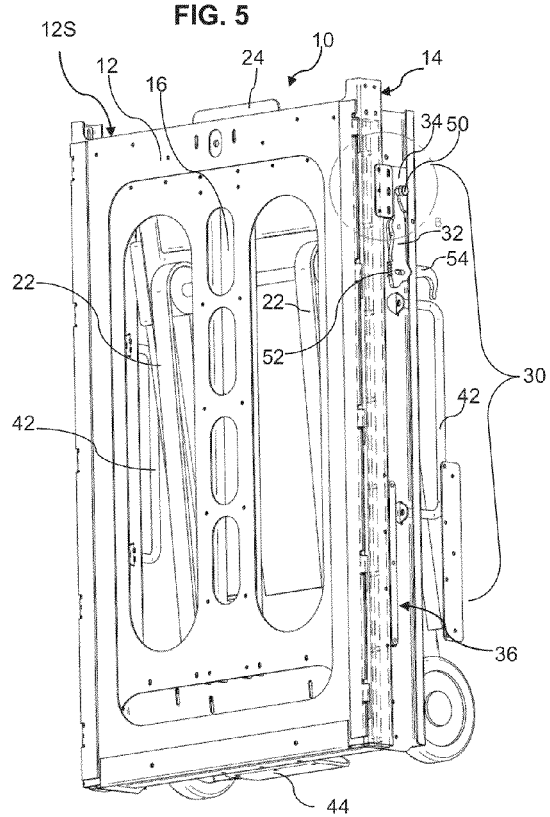
FIG. 5 is a bottom rear perspective view of the paramedic chair carrier of FIG. 1 showing the paramedic chair carrier in a retracted configuration with a paramedic chair secured thereto.
Figure 5A:
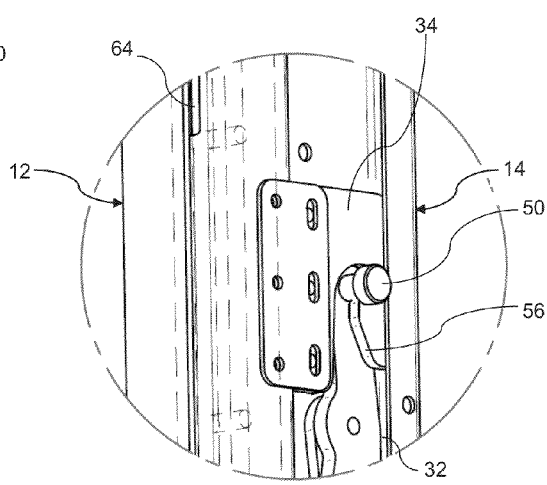
FIG. 5A is an enlarged view of a portion of FIG. 5.

FIGS. 4A, 5 and 5B show the exemplary locking latch system 30 in detail. In the illustrated embodiment, the first lock component 32 is a locking member 32 pivotally mounted to the sliding frame 14 and having a locking post 50 at its superior end, a set of teeth 52 at its inferior end, and an actuator 54. The second lock component 34 is a hook 34 fixed to the main frame 12 adjacent the superior end 12S thereof. When the sliding frame 14 is in the retracted position, the locking post 50 is aligned with the hook 34 and can be pivoted into and out of engagement with the hook 34 by pivoting the locking member 32. When the hook 34 engages the locking post 50, the sliding frame 14 will be retained in the retracted position. A biasing member in the form of a spring 33 (FIGS. 3A and 3B) acts between the locking member 32 and the sliding frame 14 to bias the locking member 32 such that the teeth 52 are biased toward the main frame 12 while the locking post 50 is biased away from the main frame 12 and therefore toward the gap of the hook 34 when the sliding frame 14 is in the retracted position. The bite of the hook 34 includes an angled guide surface 56 (FIG. 5A) which, as the sliding frame 14 moves toward the retracted position, acts as a cam surface for the locking post 50 to guide the locking post 50 into the gap of the hook 34. A user can release the sliding frame 14 from the retracted position by pulling the actuator 54, which pivots the locking post 50 toward the main frame 12 and out of engagement with the hook 34, enabling the sliding frame 14 to slide out of the retracted position toward the extended position.

Stabilization of the paramedic chair carrier 10 in the extended position, or in an intermediate position between the extended position and the retracted position, is often desirable to facilitate disengagement of the paramedic chair 46 from the paramedic chair carrier 10. To achieve this end, the locking latch system 30 may further comprise a third lock component 36 carried by the main frame 12 and with which the first lock component 32 is selectively interengageable to releasably lock the sliding frame 14 in the extended position, and preferably also in at least one intermediate position. In the illustrated embodiment, the third lock component 36 comprises a toothed rack 36 whose teeth are interengageable with, i.e. can mesh with, the teeth 52 on the locking member 32. The toothed rack 36 is disposed inferiorly of the hook 34, and when the sliding frame 14 is in the extended position, the teeth 52 on the locking member 32 are in registration with the teeth on the toothed rack 36. As noted above, the locking member 32 is biased by the spring 33 such that the teeth 52 are biased toward the main frame 12, and hence when the sliding frame 14 is in the extended position, the teeth 52 on the locking member 32 are biased into engagement with the teeth on the toothed rack 36 to lock the sliding member 14 in the extended position. By providing a toothed rack 36 of sufficient length, the sliding frame 14 can also be locked in one or more intermediate positions that are substantially closer to the extended position than to the retracted position. The ability to lock the sliding frame 14 in an intermediate position accommodates situations in which the surface onto which the paramedic chair 46 is to be deployed is uneven, for example where an ambulance is stopped on a roadway but the door 40 to which the paramedic chair carrier 10 is mounted is opened over a raised sidewalk. Analogously to the retracted position, user can release the sliding frame 14 from the extended or intermediate position by pulling the actuator 54, which pivots the teeth 52 on the locking member 32 away from the main frame 12 and out of engagement with the toothed rack 36, enabling the sliding frame 14 to slide freely.

The locking latch mechanism 30 shown in the drawings and described above is merely exemplary, and many other suitable locking latch mechanisms may also be used. Moreover, while in the illustrated embodiment a single locking latch mechanism 30 is arranged on one side of the paramedic chair carrier 10, in other embodiments one such locking latch mechanism may be positioned on each side of the paramedic chair carrier.

In the illustrated embodiment, the paramedic chair carrier 10 further comprises a step 44 carried by the sliding frame 14 at the distal end 14D thereof. When the first lock component 32 and the second lock component 34 are disengaged, the paramedic or other user may place his or her foot on the step 44 to apply additional force to move the sliding frame 14 toward the extended position. The exemplary paramedic chair carrier 10 further comprises a pair of handles 42 positioned on either side of the sliding frame 14; a paramedic or other user may grasp the handles to assist in moving the sliding frame 14 between the extended and retracted positions. The actuator 54 is preferably positioned adjacent one of the handles 42, so that a paramedic or other user can pull the actuator 54 with his or her index finger while grasping the handle 42. In the illustrated embodiments, two handles 42 are shown on the sliding frame 14; in other embodiments only a single handle may be provided, or more than two handles may be provided.

FIGS. 3B and 4 illustrate an exemplary procedure for how a paramedic chair 46 may be engaged with and disengaged from the exemplary paramedic chair carrier 10. To engage the paramedic chair 46 with the paramedic chair carrier 10, the sliding frame 14 is placed in the extended position or an intermediate position so that its distal end 14D is at or adjacent ground level. The paramedic chair 46 is then rolled up to the sliding frame 14 until the tracks 22 of the paramedic chair 46 are positioned over the chair support hooks 20, as shown in FIG. 4. The paramedic chair 46 is then pivoted until the tracks 22 are approximately parallel with the plane in which the sliding frame 14 slides. The paramedic chair tracks 22 are then received by the chair support hooks 20. Where the paramedic chair carrier 10 incorporates the second chair handle latch system shown in FIGS. 3A and 3B, at this point the latching tabs 25 are pivoted downwardly and locked in the lowered retaining position to trap the paramedic chair handle 26. Where the paramedic chair carrier 10 incorporates the first chair handle latch system shown in FIGS. 1, 2 and 4 to 5A, the step of securing the paramedic chair handle 26 is deferred. The sliding frame 14 is then released from the extended or intermediate position and slid upwardly into the retracted position, where it is locked by interengagement of the locking post 50 with the hook 34. The chair support hooks 20 support the paramedic chair tracks 22 and thereby support the paramedic chair 46. Where the paramedic chair carrier 10 incorporates the first chair handle latch system shown in FIGS. 1, 2 and 4 to 5A, sliding the sliding frame 14 into the retracted position also moves the paramedic chair handle 26 past the tabs 24A to trap the paramedic chair handle 26. The paramedic chair 46 can be deployed by reversing the above procedure.

The paramedic chair carrier 10 shown in the Figures and described above is merely one exemplary embodiment of a paramedic chair carrier that enables more generalized methods for deploying a paramedic chair from, and stowing a paramedic chair in, a vehicle such as an ambulance. These more generalized methods will now be described.

Reference is first made to FIG. 6, which is a flow chart showing an exemplary method 600 for deploying a paramedic chair from a vehicle. At step 602, a vehicle door is opened, with the paramedic chair in a collapsed configuration and carried by the vehicle door. At step 604, the paramedic chair is slid downwardly relative to the vehicle door to a deployment position in which wheels of the paramedic chair engage a deployment surface, such as a roadway, sidewalk or ground. At optional step 606, a handle of the paramedic chair is released. Step 606 may be performed before, during or after step 604, but is generally performed before step 608, and in some embodiments may be omitted entirely. At step 608, the paramedic chair is pivoted on its wheels away from the vehicle door, and at step 610, the paramedic chair is rolled on its wheels away from the vehicle door.

Reference is now made to FIG. 7, which is a flow chart showing an exemplary method 700 for stowing a paramedic chair in a vehicle. At step 702, the paramedic chair, in a collapsed configuration, is rolled on its wheels toward an open vehicle door. At step 704, the paramedic chair is pivoted on its wheels toward the vehicle door, and at step 706, the paramedic chair is slid upwardly relative to the vehicle door to a stowed position in which wheels of the paramedic chair are above an interior floor of the vehicle. At optional step 708, the handle of the paramedic chair is secured. Step 708 may be performed before, during or after step 706, but is generally performed before step 710, which is closing the vehicle door.

One or more currently preferred embodiments have been described by way of example. It will be apparent to persons skilled in the art that a number of variations and modifications can be made without departing from the scope of the claims.

What is claimed is:

1. A paramedic chair carrier, comprising:
    a main frame mounted to an interior face of a vehicle door;
    a sliding frame slidably carried by the main frame so as to be slidable between an extended position and a retracted position relative to the main frame;
    an actuator acting between the main frame and the sliding frame and operable to move the sliding frame toward the retracted position;
    at least one chair support hook disposed at a distal end of the sliding frame relative to the main frame for supporting a paramedic chair;
    at least one chair retaining latch carried by the sliding frame for releasably retaining a paramedic chair; and
    a paramedic chair supported on the at least one chair support hook and retained by the at least one chair retaining latch;
    wherein wheels of the paramedic chair extend beyond the distal end of the sliding frame and are unsupported by the sliding frame; and
    wherein, when the sliding frame is in the extended position, the paramedic chair can be disengaged from the paramedic chair carrier by, after releasing the paramedic chair from the at least one chair retaining latch, then pivoting the paramedic chair away from the sliding frame, wherein said pivoting is on the wheels of the paramedic chair.

2. The paramedic chair carrier of claim 1, wherein:
    the paramedic chair carrier further comprises a locking latch system, the locking latch system comprising a first lock component carried by the sliding frame and a second lock component carried by the main frame;
    the first lock component and the second lock component being selectively interengageable to releasably lock the sliding frame in the retracted position;
    the locking latch system further comprises a third lock component carried by the main frame; and
    the first lock component and the third lock component are selectively interengageable to releasably lock the sliding frame in the extended position.

3. The paramedic chair carrier of claim 2, wherein:
    the first lock component and the third lock component are selectively interengageable to releasably lock the sliding frame in at least one intermediate position between the extended position and the retracted position; and
    the at least one intermediate position is substantially closer to the extended position than to the retracted position.

4. The paramedic chair carrier of claim 1, wherein the at least one chair retaining latch is carried by the sliding frame.

5. The paramedic chair carrier of claim 1, wherein the at least one chair support hook supports the paramedic chair by tracks of the paramedic chair being received by the at least one chair support hook.

6. The paramedic chair carrier of claim 1, wherein:
    the main frame is mounted to an interior face of a vehicle door;
    the sliding frame is in the retracted position; and
    the paramedic chair is secured to the paramedic chair carrier by:
        the paramedic chair being supported by the at least one chair support hook; and
        the paramedic chair handle being releasably retained by the at least one chair retaining latch.

7. The paramedic chair carrier of claim 6, wherein the vehicle is an ambulance.

8. The paramedic chair of claim 6, wherein the vehicle door is a side service door.

9. The paramedic chair carrier of claim 1, further comprising a step carried by the sliding frame at the distal end thereof for foot placement to assist in moving the sliding frame from the retracted position toward the extended position.

10. The paramedic chair carrier of claim 1, further comprising at least one handle carried by the sliding frame to assist in moving the sliding frame between the retracted position and the extended position.

11. A method for deploying a paramedic chair from a vehicle, comprising:
    opening a vehicle door, wherein the paramedic chair is in a collapsed configuration and is carried on an interior face of the vehicle door;
    sliding the paramedic chair downwardly relative to the vehicle door to a deployment position in which wheels of the paramedic chair engage a deployment surface;
    pivoting the paramedic chair away from the vehicle door, wherein said pivoting is pivoting on the wheels of the paramedic chair; and
    rolling the paramedic chair away from the vehicle door.

12. The method of claim 11, further comprising releasing a handle of the paramedic chair before pivoting the paramedic chair away from the vehicle door.

13. A method for stowing a paramedic chair in a vehicle, comprising:
    rolling the paramedic chair toward an open vehicle door, wherein the paramedic chair is in a collapsed configuration;
    pivoting the paramedic chair toward the vehicle door, wherein said pivoting is pivoting on wheels of the paramedic chair;
    sliding the paramedic chair upwardly relative to the vehicle door to a stowed position in which the paramedic chair is carried on an interior face of the vehicle door and the wheels of the paramedic chair are above an interior floor of the vehicle; and closing the vehicle door.

14. The method of claim 13, further comprising securing the handle of the paramedic chair after pivoting the paramedic chair toward the vehicle door on the wheels of the paramedic chair.

15. The method of claim 11, wherein:
    when sliding the paramedic chair downwardly relative to the vehicle door, the paramedic chair is engaged with a sliding frame that is slidably carried by the door; and
    when the paramedic chair is engaged with the sliding frame, the wheels of the paramedic chair extend beyond a distal end of the sliding frame and are unsupported by the sliding frame.

16. The method of claim 15, wherein:
    a main frame is mounted to an interior face of a vehicle door;
    the sliding frame is slidably carried by the main frame so as to be movable between an extended position and a retracted position relative to the main frame; and
    when sliding the paramedic chair downwardly relative to the vehicle door, the paramedic chair is engaged with the sliding frame by:
        the paramedic chair being supported by at least one chair support hook on the sliding frame; and
        the paramedic chair handle being releasably retained by at least one chair retaining latch on the sliding frame.

17. The method of claim 13, wherein:
    when sliding the paramedic chair upwardly relative to the vehicle door, the paramedic chair is engaged with a sliding frame that is slidably carried by the door; and when the paramedic chair is engaged with the sliding frame, the wheels of the paramedic chair extend beyond a distal end of the sliding frame and are unsupported by the sliding frame.

18. The method of claim 17, wherein:

a main frame is mounted to an interior face of a vehicle door;

the sliding frame is slidably carried by the main frame so as to be movable between an extended position and a retracted position relative to the main frame; and when sliding the paramedic chair upwardly relative to the vehicle door, the paramedic chair is engaged with the sliding frame by:

the paramedic chair being supported by at least one chair support hook on the sliding frame; and the paramedic chair handle being releasably retained by at least one chair retaining latch on the sliding frame.

* * * * *